(12) United States Patent
Appel et al.

(10) Patent No.: US 6,287,507 B1
(45) Date of Patent: Sep. 11, 2001

(54) PROCESS FOR TEMPERATURE-CONTROL OF PREFORMS AND TEMPERATURE-CONTROL DEVICE

(75) Inventors: Otto Appel, Ahrensburg; Karl-Heinz Balkau, Oststeinbek; Wolf Jaksztat, Hamburg, all of (DE)

(73) Assignee: Krupp Corpoplast Maschinenbau GmbH, Hamburg (DE)

( * ) Notice: Subject to any disclaimer, the term of this patent is extended or adjusted under 35 U.S.C. 154(b) by 0 days.

(21) Appl. No.: 09/142,527
(22) PCT Filed: Mar. 1, 1997
(86) PCT No.: PCT/DE97/00399
§ 371 Date: Oct. 14, 1998
§ 102(e) Date: Oct. 14, 1998
(87) PCT Pub. No.: WO97/32713
PCT Pub. Date: Sep. 12, 1997

(30) Foreign Application Priority Data

Mar. 6, 1996 (DE) .............................................. 196 08 570

(51) Int. Cl.$^7$ .................................................. B29C 49/64
(52) U.S. Cl. ........................................... 264/521; 264/327
(58) Field of Search ...................................... 264/327, 521

(56) References Cited

U.S. PATENT DOCUMENTS

| 3,632,713 | 1/1972 | Seefluth . |
| 3,775,524 | 11/1973 | Seefluth . |
| 3,892,830 | 7/1975 | Hudson et al. . |
| 3,950,459 | 4/1976 | Seefluth . |
| 5,292,243 | 3/1994 | Gibbemeyer . |

FOREIGN PATENT DOCUMENTS

| 2160541 | 10/1994 | (CA) . |
| 2211307 | 9/1973 | (DE) . |
| 620 099 A1 | 10/1994 | (EP) . |
| 2140170 | 1/1973 | (FR) . |

*Primary Examiner*—Leo B. Tentoni
(74) *Attorney, Agent, or Firm*—Harness, Dickey & Pierce, P.L.C.

(57) ABSTRACT

The method serves for tempering preforms made of a thermoplastic material. The preforms are provided for blow deformation into containers. The preform is provided with a temperature profile along the periphery. The temperature profile is produced in that striplike regions extending in the direction of the longitudinal axis of the preform are heated differentially. Stepwise tempering is carried out for successively timed thermal conditioning of various regions of the preform.

15 Claims, 8 Drawing Sheets

PROCESS FOR TEMPERATURE-CONTROL OF PREFORMS AND TEMPERATURE-CONTROL DEVICE

BACKGROUND AND SUMMARY OF THE INVENTION

The invention relates to a method for tempering preforms made of a thermoplastic material wherein the preforms are provided for blow deformation into containers, in which the preform is provided along the periphery with a temperature profile which is produced in that striplike regions or sectors extending in the direction of a longitudinal axis of the preform are heated differentially.

In addition, the invention relates to a device for tempering preforms made of a thermoplastic material which has at least one conveyor line for the preforms and at least one heating means and provides the preforms with a temperature profile in the peripheral direction of the preforms.

Such a method is employed when, for example, containers whose cross section differs from a round shape are to be produced. The difference, for example, may consist in producing containers with an oval cross section or for example with a triangular or rectangular cross section.

The production of such unround containers has already been described in U.S. Pat. No. 3,775,524. First, symmetrical tempering of the preforms takes place; then, the temperature is selectively increased in selected regions. Additional variants for producing temperature profilings in the peripheral direction of preforms are likewise described in U.S. Pat. No. 3,632,713, U.S. Pat. No. 3,950,459 and U.S. Pat. No. 3,892,830. Temperature conditioning by selective shading is indicated in DE-OS 3,314,106.

U.S. Pat. No. 5,292,243 discloses that two preforms may be simultaneously subjected to temperature conditioning in the peripheral direction. A combination of methods known in the prior art for the temperature conditioning of preforms is found in EP-OS 0,620,099.

Common to the previously known methods is that either there is a relatively high cost for apparatus or only relatively poor reproducibility can be ensured.

The object of the present invention is therefore to indicate a method of the type mentioned at the beginning by which high quality temperature conditioning can be obtained at low cost.

This object is accomplished, according to the invention, in that stepwise tempering is carried out for successively timed thermal conditioning of unlike regions of the preform.

An additional object of the present invention is to construct a device of the type mentioned at the beginning so as to permit selective tempering of the preform with high reproducibility.

According to the invention, this object is accomplished in that a rotational drive having a steplike mode of operation is provided for performing a motion of rotation of the preform.

Stepwise tempering of the preform makes it possible to arrange, for example, along a transport path of the preform, conventional radiant heaters of the prior art with IR radiators and to expose various regions of the preform to radiation for various lengths of time. In this connection in particular, no troublesome coordination between the rate of the longitudinal motion of the preform in the direction of transport and the rate of rotation is required.

Implementation of the method using simple equipment may be effected in that stepwise rotation is carried out with phases of motion and rest.

The drive method may likewise be simplified in that one and the same direction of rotation is provided for stepwise rotation.

To prevent unsymmetries in heating, it is alternatively possible for alternating directions of rotation to be provided.

A very symmetrical temperature profile in the peripheral direction can be obtained in that a change in the direction of rotation is made each time that a complete rotation of 360° is carried out.

Depending upon the respective application requirements, it is alternatively possible for a change in the direction of rotation to be made each time that an integral multiple of a complete rotation of 360° is carried out.

For containers with the mouth section arranged symmetrically with regard to the container center line, it is advantageous for a symmetrical temperature profile to be produced in the peripheral direction.

In the case of a mouth section arranged unsymmetrically, it may be advantageous for an unsymmetrical temperature profile to be produced in the peripheral direction.

Uniform distribution of material in blow deformation of the container is promoted in that a stretch ratio in the region from 1:1.5 to 1:2.2 is set. An upper interval limit of 2.0 is preferable.

Adaptation of the stretch ratio to the shape of the container may be effected in that with increasing unroundness of the containers to be produced the stretch ratio moves toward 1:1.5.

An additional positive influence on the distribution of material may be obtained in that the stretch operation is carried out with the aid of compressed air.

It is likewise advantageous for the distribution of material that the supply of compressed air be effected so that, during stretching, contact of the preform with the blow mold is prevented during stretching and contact of the expanding preform takes place exclusively in the region of the inner wall of a blow mold extending in the vicinity of a minimum mold diameter with regard to an unround container cross section.

Optimal coordination of stretching rate and compressed air supply is effected in that the supply of compressed air during performance of the stretching operation is selected so that contact in the longitudinal direction of the expanding preform with the blow mold takes place exclusively in a center region, in the longitudinal direction of the mold.

Another variant for accomplishing step operation consists in that the preforms are moved at a constant rate and the heating means are controlled stepwise.

It is likewise possible for an alternating facing arrangement of heating means along the direction of transport of the preforms to be provided and for the preforms to be carried past the heating means nonrotating and heated stepwise in unlike regions of their extension. A facing arrangement may also be selected for reasons of space.

An especially simple arrangement is obtained in that the preforms are first uniformly tempered and then blown on by a cooling nozzle for partial cooling.

BRIEF DESCRIPTION OF THE DRAWINGS

Examples of the invention are represented schematically in the drawing, wherein.

DESCRIPTION OF THE PREFERRED EMBODIMENTS

Figure 1:
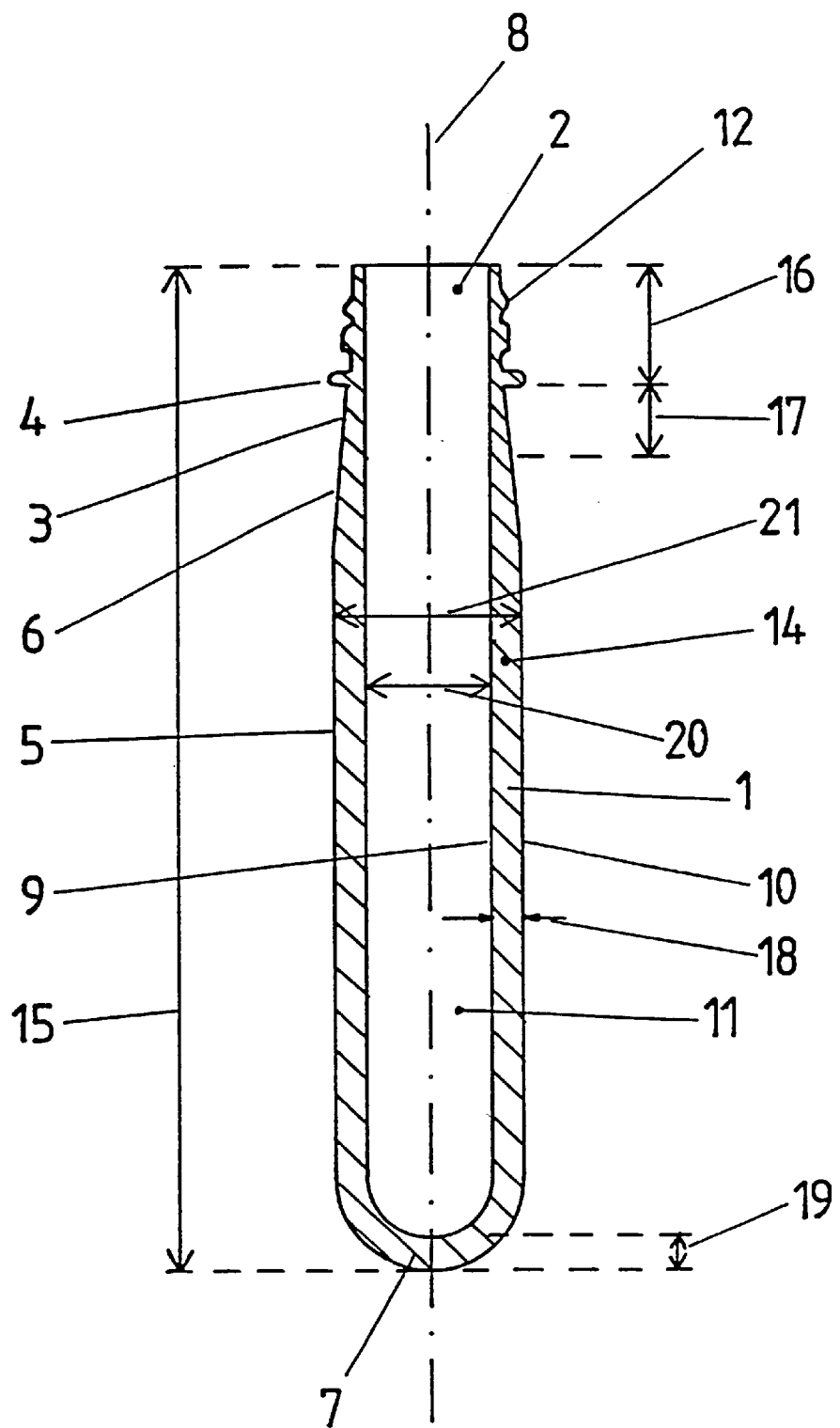
FIG. 1 is a longitudinal section view of a preform.
Figure 2:
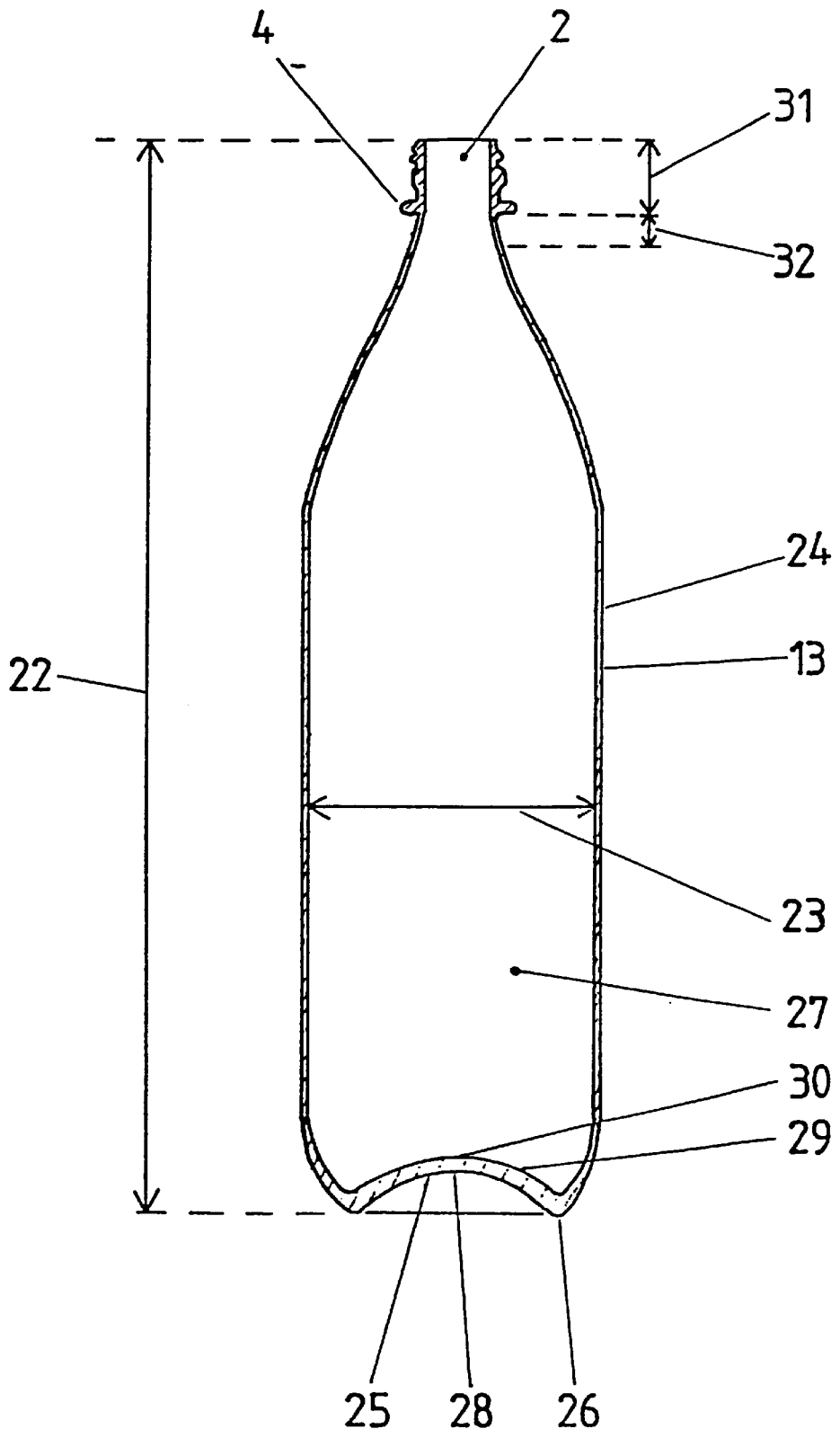
FIG. 2 is a longitudinal section view of a bottle-shaped container.

According to the embodiment in FIG. 1 a preform (1) consists of a mouth section (2), a supporting ring (4) separating the mouth section (2) from a neck region (3), a shoulder region (6) converting the neck region (3) into a wall section (5), as well as a bottom (7). The supporting ring (4) overhangs the mouth section (2) in a direction transverse to a longitudinal axis (8). In the area of the shoulder region (6), starting from the neck region (3) the outside diameter of the preform (1) widens in the direction of the wall section (5). In the case of a container (13) (as shown in FIG. 2). To be produced from the preform (1), the wall section (5) essentially forms the side wall of the container. The bottom (7) is designed rounded.

The mouth section (2) may be provided, for example, with an external thread (12), making it possible to place a screw closure on the finished container (13). However, it is alternatively possible to provide the mouth section (2) with an external bead to provide a gripping surface for a crown cap. In addition, a multiplicity of additional forms is possible to permit the use of plug closures.

It can be seen in the representation of FIG. 1 that the wall section (5) has an inner surface (9) as well as an outer surface (10). The inner surface (9) delimits an interior space (11) of the preform.

In the shoulder region (6), starting from the neck region (3) the thickness of a preform wall (14) may increase toward the wall region (5) . In the direction of the longitudinal axis (8), the preform (1) has a preform length (15). In the direction of the longitudinal axis (8), the mouth region (2) and the supporting ring (4) extend with a common mouth length (16). The neck region (3), in the region of the longitudinal axis (8), has a neck length (17). In the neck region (3) the preform (3) (1) advantageously extends at constant wall thickness.

In the wall region (5), the preform (1) has a wall thickness (18), while in the region of the bottom (7), a bottom thickness (19) is found. Additional dimensioning of the preform (1) is provided by means of the inside diameter (20) and the outside diameter (21), which are measured in the wall region (5) running approximately cylindrically.

In the bottle-shaped container (13) represented in FIG. 2, the mouth section (2) and the supporting ring (4) are found essentially unchanged. The remaining regions of the container (13) are expanded by the biaxial orientation carried out in a transverse direction as well as in a longitudinal direction relative to the preform (1). The container (13) thus has a length (22) and a diameter (23) in which, in view of the accuracies to be taken into consideration, no distinction will be made in the following with regard to the specific inside diameter and/or outside diameter.

FIG. 2 shows in particular the bottom region of the blow-molded container (13). The container (13) has a side wall (24) and a bottom (25). The container bottom (25) consists of a stand ring (26) and a dome (28) arched inward in the direction of the container interior (27). The dome (28) is made up of a bevel (29) and a center (30).

The container (13) has a mouth length (31) and a neck length (32), the container mouth length (31) as a rule being at least equal to the mouth length (16) of the preform (1).

Heating of the preform (1) before the orienting operation may be done in a variety of ways. When a tunnel-like heating path is used, tempering takes place only as a function of retention time. However, it is likewise possible to use radiant heaters which strike the preform (1) with infrared or high-frequency radiation. Such radiators make it possible to produce a temperature profile in the region of the preform (1) in the direction of the longitudinal axis (8) or in the peripheral direction.

If such a radiant heater is made up of a plurality of heating elements controllable independently of one another which are arranged one above the other in the direction of the longitudinal axis (8), more intensive impact of the heating elements in the region of the upper extension of the preform (1) in the direction of the mouth section (2) allows greater thermal energy to be radiated in the thickened region of the wall section (5) which extend parallel to the longitudinal axis (41) than in the region of the wall section (5) turned toward the bottom (7). When radiant heaters capable of only uniform operation are used, such heat profiling may alternatively be effected by an arrangement of heating elements at various distances apart in the direction of the longitudinal axis (8).

Figure 3:
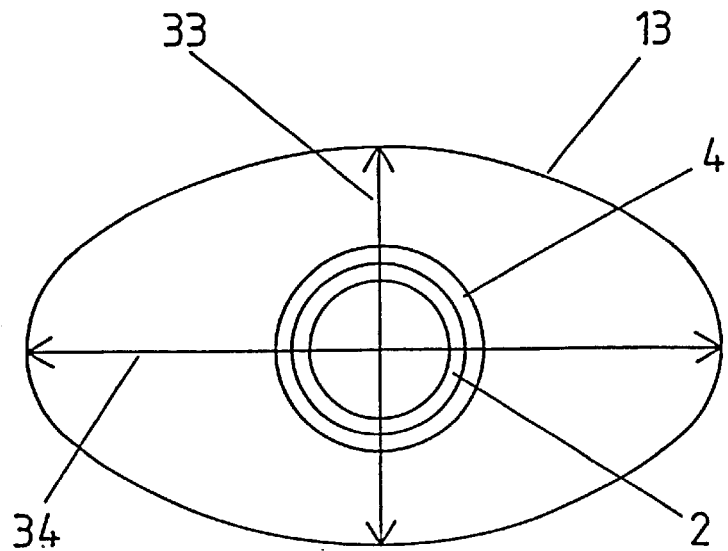
FIG. 3 is a a top view of a container having an oval cross section.

FIG. 3 shows a cross section through a container (13) with an unround cross-sectional area in the form of an oval. Consequently, here, the container diameter (23) is not constant but, rather, the container diameter (23) lies between a minimum diameter (33) and a maximum diameter (34), depending upon the direction of measurement. In the embodiment of FIG. 3, the mouth section (2) of the container (13) is arranged substantially centrally.

Figure 4:
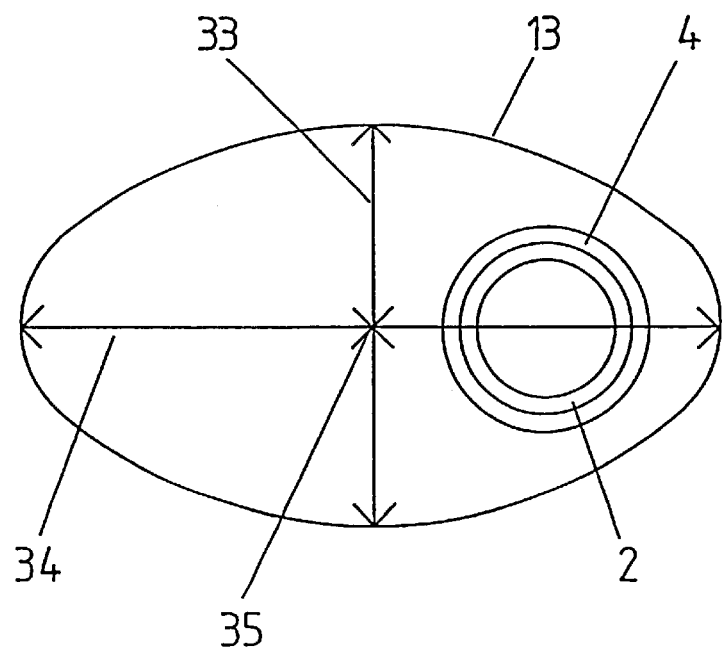
FIG. 4 is a top view of a container having an oval cross section and a mouth arranged unsymmetrically.

In the embodiment of FIG. 4, the container (13) has a shape similar to that of the container (13) of FIG. 3. However, the mouth section (2) is arranged displaced with regard to a container center line (35).

Figure 5:
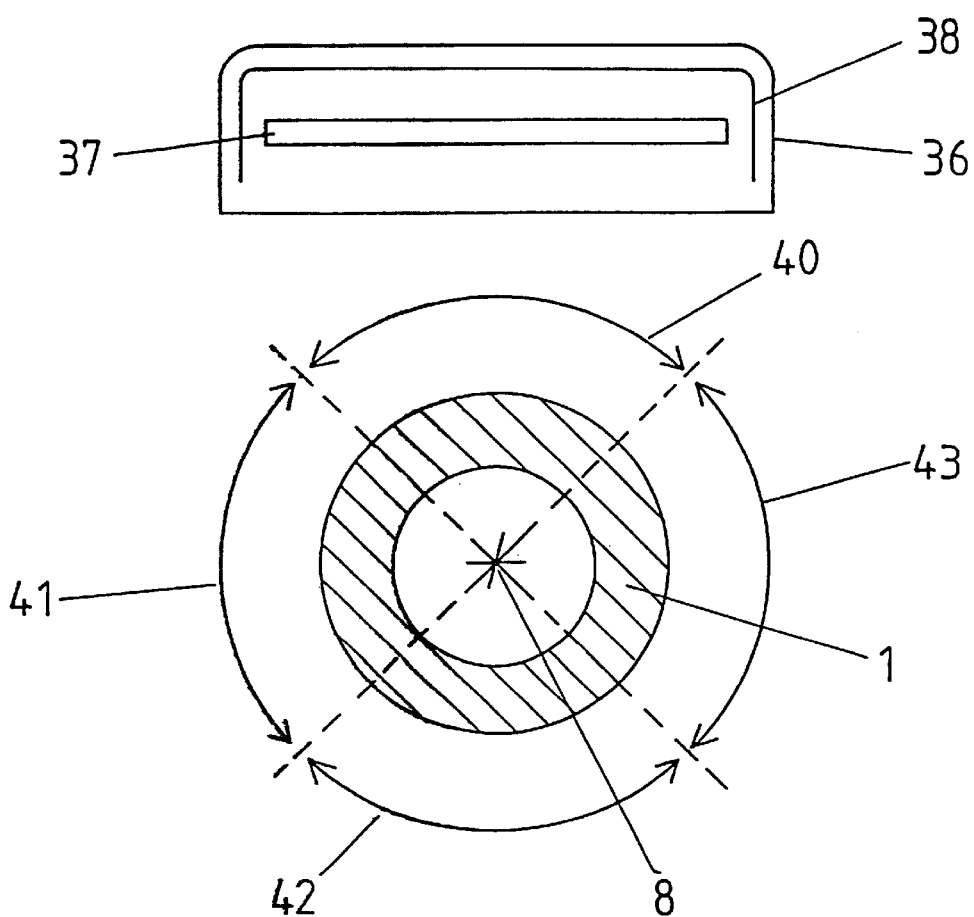
FIG. 5 is a section view of a preform positioned adjacent a radiant, the section being taken along a diametric plane extending perpendicular to the longitudinal axis.

FIG. 5 shows a horizontal section through a preform (1) arranged in the region of a heating means (36). It can be seen that the heating means (36) has a radiant heater (37) as well as a reflector (38). In this embodiment the periphery (39) of the preform (1) is divided into four strip-like regions or sectors (40, 41, 42, 43). Tempering of the sector (40) takes place differentially in the direction of the periphery (39). To produce a container (13) with a contour according to FIG. 3, it is advantageous for example to temper each of the sectors (40, 42) as well as the sectors (41, 43) at least approximately equally. In particular, the sectors (40, 42) are provided with a higher temperature than the sectors (41, 43) when an oval container (13) is to be produced. The size of the respective sectors (40, 41, 42, 43) depends upon the shape of the container (13).

Figure 6:
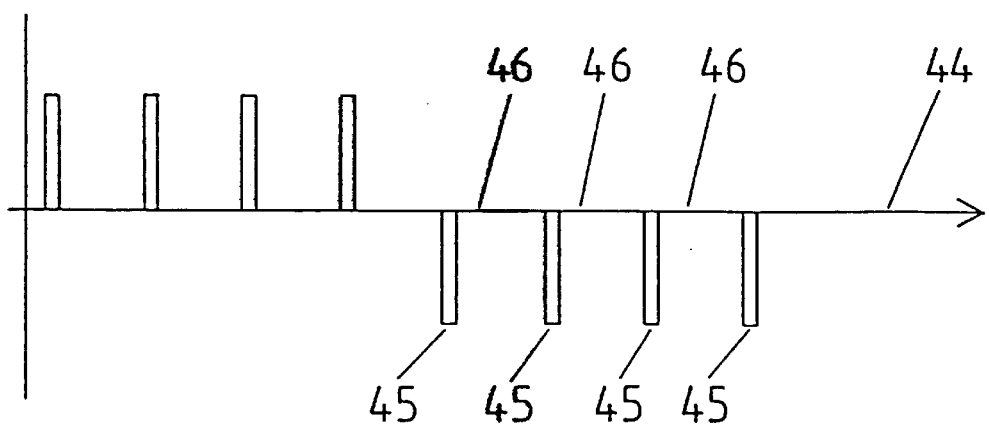
FIG. 6 is a time diagram illustrating a cycle of a motion of rotation of the preform.

To produce the temperature profile in the direction of the periphery (39), it is possible, for example, to carry out rotation of the preform (1) about the longitudinal axis (8) in stepwise motion, as is illustrated in FIG. 6 along a time axis (44). There, short periods of motion (45) and of rest (46) alike follow one another in each instance. In temperature profiling in the peripheral direction with four sectors (40, 41, 42, 43), motion may take place so that within a specifiable motion period (46), the sector (40) is first turned toward the heating means (36) and, after the end of the rest period (46), within the period of motion (45), the sector (41) is relatively rapidly carried past a heating means (36). Toward the end of the period of motion (45), the sector (42) is then turned toward the heating means (36). The preform (1) is thus rotated about approximately 180°.

It is possible, for example, to first temper the preform (1) uniformly in advance and then to produce the temperature profile by means of the motion described. It is likewise possible to provide a course of motion of the preform (1) in rotation so that, starting from a cold preform (1), the temperature profile is reached during the respective phases of motion. In at least one temperature profiling following pretempering, the periods of motion (45) are substantially shorter in time than the rest periods (46). The ratio of the durations of time may, for example, be 1:10.

Figure 7:
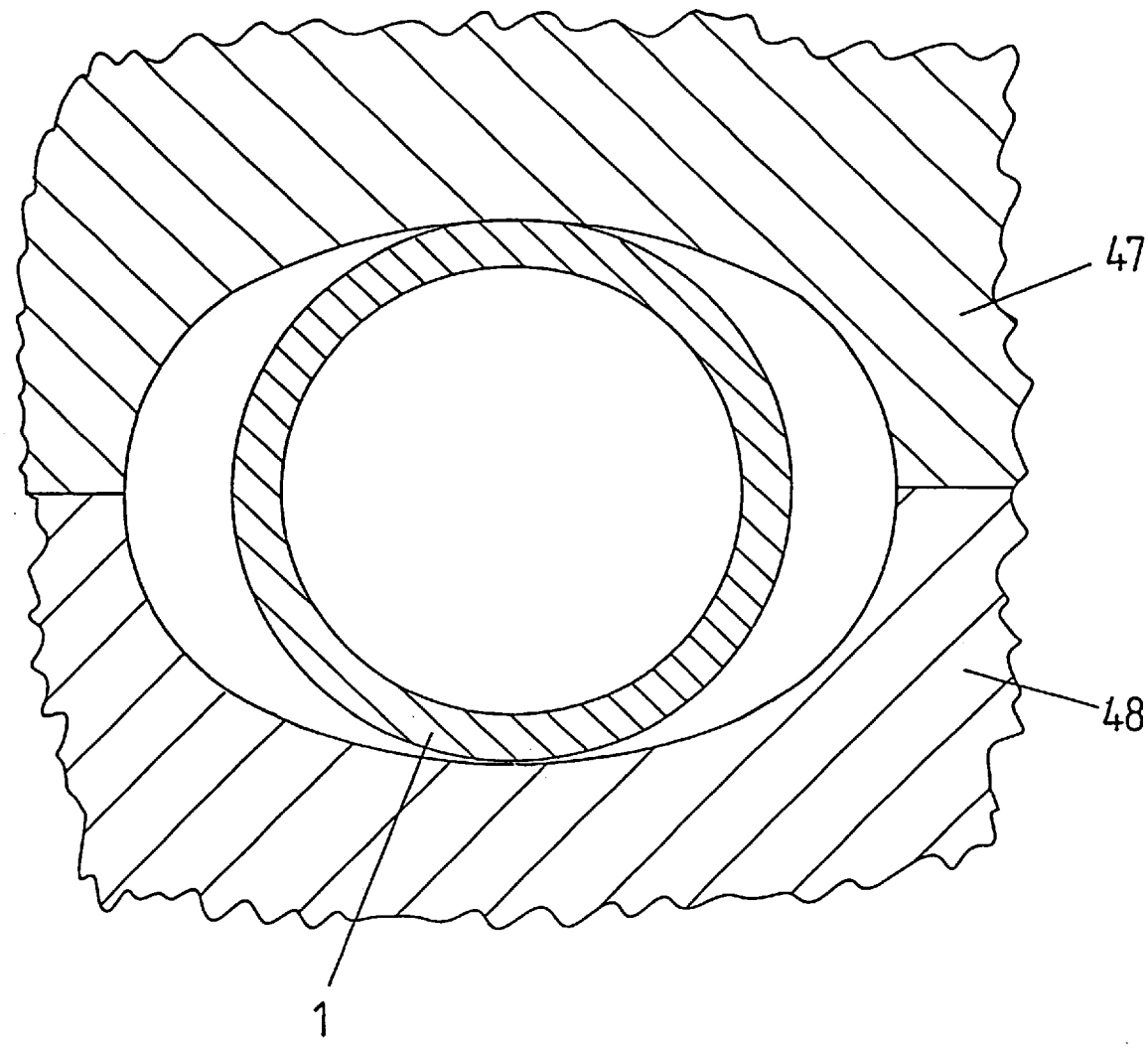
FIG. 7 is a section view of a blow mold in which a container having an oval cross section is, the preform also being shown in section.

FIG. 7 shows the arrangement of a preform (1) already partly expanded in a blow mold consisting of mold halves (47, 48). In the state of expansion shown, the preform (1) has already made contact with the mold walls arranged at a relatively short distance apart.

Figure 8:
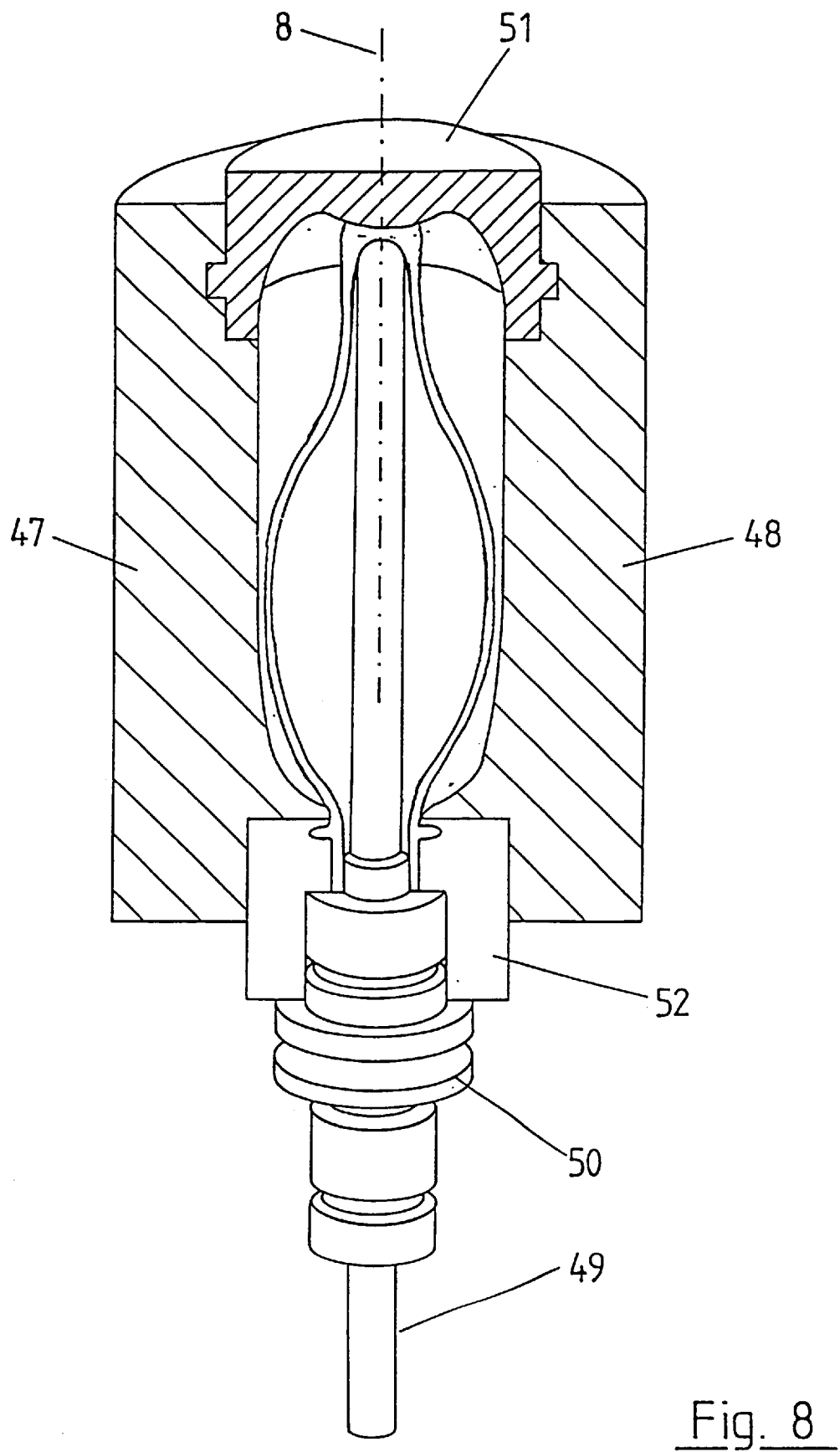
FIG. 8 is a section view of the blow mold of FIG. 7.

FIG. 8 shows the arrangement of the already partly expanded preform (1) in the mold halves (47,48) in a vertical section. It can be seen that the preform (1) has been stretched by a stretching bar (49) which is carried through a connecting piston (50). A bottom insert (51) and a threading insert (52) have been inserted into the mold halves (47, 48). The combination of stretching, tempering of the preform (1) and expansion ensures that the expanding preform (1), in the direction of the longitudinal axis (8), first comes to rest in a center region of the mold halves (47, 48).

Figure 9:
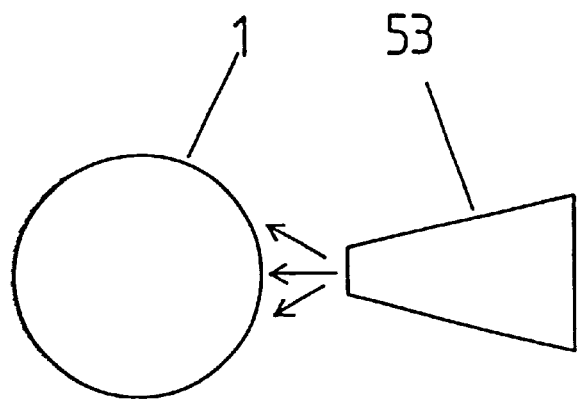
FIG. 9 is a diagrammatic representation illustrating selective cooling of a preform.

FIG. 9 shows another possible mode of producing a temperature profile. Here, a pretempered preform (1) is moved in step operation past a cooling nozzle (53) from which flows a cooling gas. Air, for example, may be used.

Figure 10:
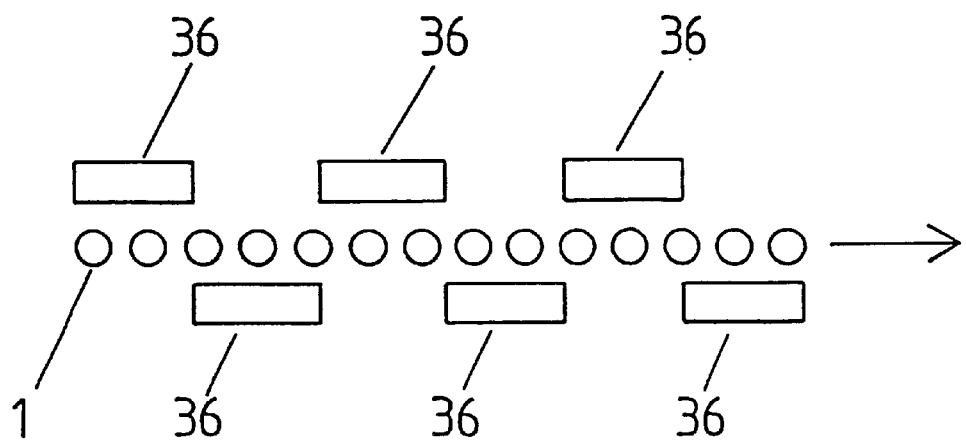
FIG. 10 is a schematic representation illustrating temperature conditioning of preforms by alternately arranged heating elements with nonrotating preforms.

In the embodiment of FIG. 10, the preforms (1) are carried past heating means (36) arranged alternately on facing sides of the transport path. Rotation of the preforms is not provided here, but stepwise heating is produced by the heating zones following one another on either side of the transport path. The staggered facing arrangement prevents the heating means from radiating into one another. With the use of suitable cooling, however, it is alternatively possible to produce a facing arrangement or a partially overlapping staggered arrangement.

Figure 11:
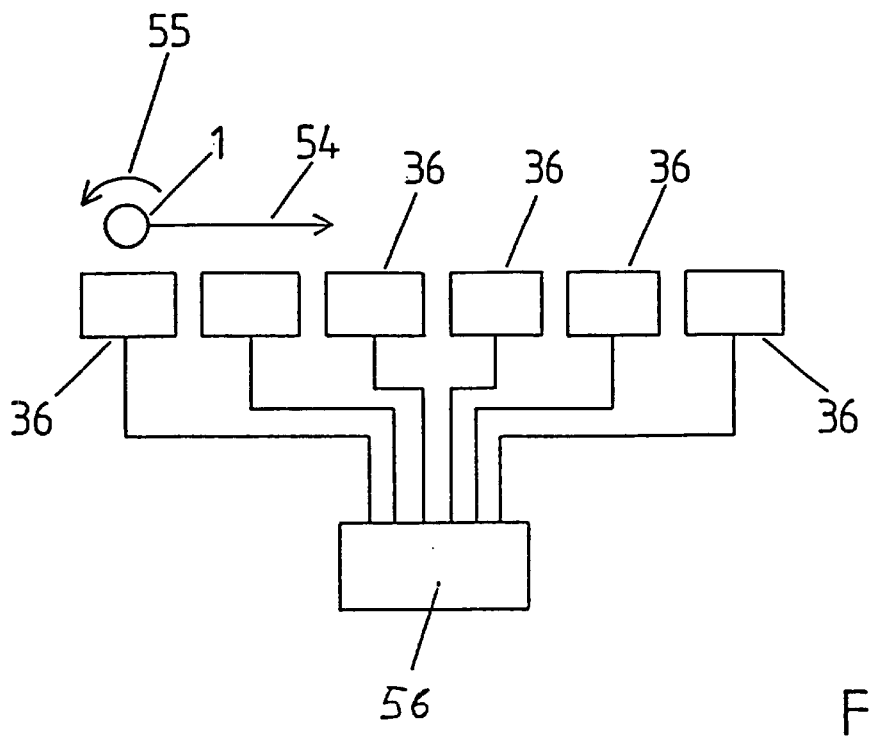
FIG. 11 is a schematic representation illustrating temperature conditioning of a preform by variable control of heating means and FIG. 12 is a diagram illustrating the dependence of the stretch ratio on the side ratio of the unround bottle.

FIG. 11 shows an additional variant. Here the preforms (1) are moved in the direction of transport (54) as well as in the direction of rotation (55). The heating means (36) are connected to a heating control (56) which controls the heating means (36) lying one after the other in the direction of transport (54) so that the desired temperature profile is produced in the peripheral direction on the preforms (1) as they move past. In this embodiment, it is advantageous to use relatively small sized heating elements (36), in order to meet a precise temperature specification.

Figure 12:
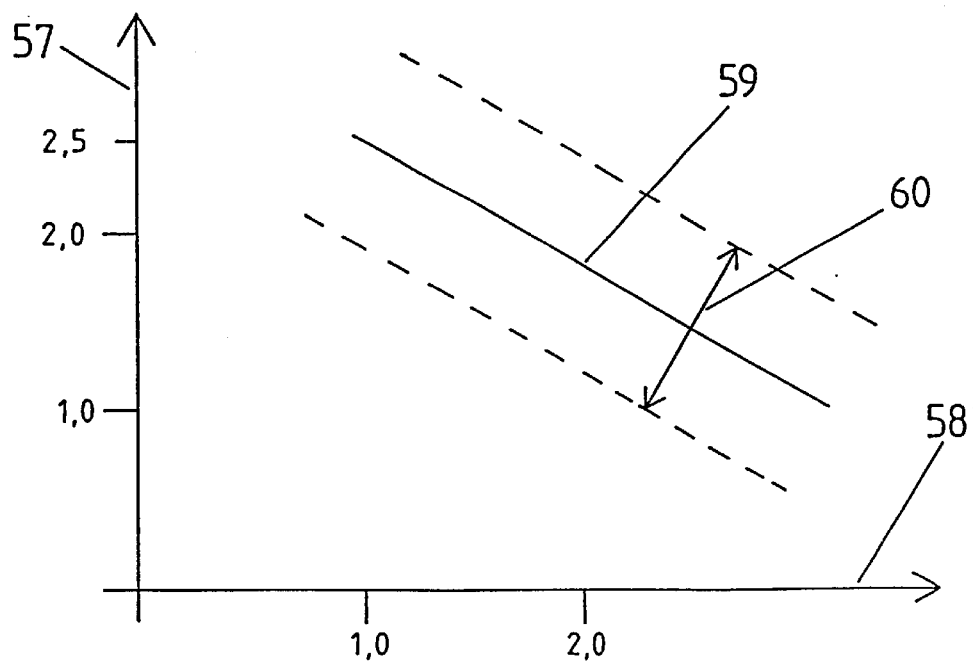

In a diagram that has a stretch factor axis (57) and a side ratio axis (58), FIG. 12 illustrates the course of a stretch ratio (59) as a function of the ratio of minimum container diameter (33) and maximum container diameter (34). The quotient of the diameters (33, 34) is plotted on the side ratio axis (58). A variation range (60) for the course of the stretch ratio (59) is entered in broken lines in FIG. 12. In principle, with increasing quotients of maximum container diameter (34) and minimum container diameter (33), the stretch ratio of stretched length of the preform (1) to unstretched length decreases.

For later handling of blown unround containers (13), it may be of advantage if the containers (13) have detectable markings or mechanically determinable structures. For visual determination of rotational orientation, it is possible, for example, to place markings in the region of the mouth section (2), in the region of the supporting ring (4), or below the mouth section (2) which differ with regard to their transparency relative to the surrounding material. For example, patterned surfaces with little roughness, or the use of material opacities which may be designed for example as regions of crystallization produced by the effect of heat, are possible here. In the region of non-oriented amorphous material such crystallization effects lead to a milky appearance of the material.

It is likewise possible to arrange mechanically detectable projections or depressions in the regions described above. Here, in a rotation relatively simple to accomplish mechanically, the container (13) with its marking is driven against a shoulder.

The markings described above may also be used in container production and in tempering of preforms (1) to assume pre-determined positions in each instance so that exactly known rotational orientations of the preforms (1) and any intermediate products, as well as of blown containers (13), are present during the entire production process, as well as in later handling.

The measures described for producing a temperature profile in the region of the preform (1) in the direction of its longitudinal axis (8) as well as in the peripheral direction may be combined with one another as desired to permit adaptation to the preform geometries specifically required in each instance.

In principle, any desired synthetic thermoplastic materials may be processed according to the method described and using the device described. In particular, it is possible, for example, to process preforms of polypropylene or of polyethylene terephthalate.

With regard to the various possibilities described for tempering of the preform (1), in which the preform (1) is first tempered essentially uniformly in the region to be tempered and then is provided with added temperature profiling, it is additionally to be noted that such tempering may alternatively be applied in the peripheral direction of the preform (1) as well as in the longitudinal direction of the preform (1) or combined in both spatial orientations. In addition, heat profiling in the longitudinal direction is selected so that high and uniform orientation of the material is obtained, in order to ensure good strength of the blown container (13) as well as economical use of material.

What is claimed is:

1. A method for tempering preforms made of a thermoplastic material wherein the preforms are provided for blow molding into containers, in which the preform is provided along the periphery with a temperature profile which is produced by heating strip-like regions extending in the direction of the longitudinal axis of the preform differentially, characterized in that stepwise tempering is carried out for successively timed thermal conditioning of successive regions of the preform, said preform being moved in stepwise rotation with phases of motion and rest.

2. A method according to claim 1, characterized in that said stepwise rotation is in one direction.

3. A method according to claim 1, characterized in that said stepwise rotation is in alternating directions.

4. A method according to claim 3, characterized in that the change in the direction of rotation is made each time that a complete rotation of 360° is carried out.

5. A method according to claim 3, characterized in that a change in the direction of rotation is made each time that an integral multiple of a complete rotation of 360° is carried out.

6. A method according to claim 1, characterized in that a symmetrical temperature profile is produced in the peripheral direction.

7. A method according to claim 1, characterized in that an unsymmetrical temperature profile is produced in the peripheral direction.

8. A method according to claim 1, characterized in that a stretch ratio in the region from 1:1.5 to 1:2.2 is set.

9. A method according to claim 1, characterized in that with increasing unroundness of the container (13) to be produced the stretch ratio moves toward 1:1.5.

10. A method according to claim 1, characterized in that the stretching operation is carrier out with the aid of compressed air.

11. A method according to claim 1, characterized in that the supply of compressed air is effected so that, during stretching, contact of the expanding preform (1) takes place initially in the region of the inner wall of a blow mold extending in the vicinity of a minimum mold diameter.

12. A method according to claim 1, characterized in that the supply of compressed air during performance of the stretching operation is selected so that contact in the longitudinal direction of the expanding preform (1) with the blow mold takes place initially in a center region, in the longitudinal direction of the blow mold.

13. A method according to claim 1, characterized in that the preforms (1) are moved at a constant rate and the heating means (36) are controlled stepwise.

14. A method according to claim 1, characterized in that an alternating facing arrangement of heating means (36) along a direction of transport (54) of the preforms (1) is provided and in that the preforms (1) are carried past the heating means (36) and heated stepwise in successive regions of their extension.

15. A method according to claim 1, characterized in that the preforms (1) are first uniformly tempered and then blown on by a cooling nozzle (53) for partial cooling.

* * * * *

UNITED STATES PATENT AND TRADEMARK OFFICE
CERTIFICATE OF CORRECTION

PATENT NO.    : 6,287,507 B1
DATED         : September 11, 2001
INVENTOR(S)   : Otto Appel et al.

It is certified that error appears in the above-identified patent and that said Letters Patent is hereby corrected as shown below:

Column 3,
Line 6, after "radiant" insert -- heater --.
Line 7, "." should be -- ; --.
Line 13, after "7" insert -- , the section being taken along a diametrical plane extending along the longitudinal axis --.
Line 62, delete "(3)".

Column 4,
Line 40, "(41)" should be -- (8) --.

Column 5,
Line 14, "(46)" shoud be -- (45) --.

Signed and Sealed this

Eighteenth Day of June, 2002

*Attest:*

JAMES E. ROGAN
*Director of the United States Patent and Trademark Office*

*Attesting Officer*